Figure 4:
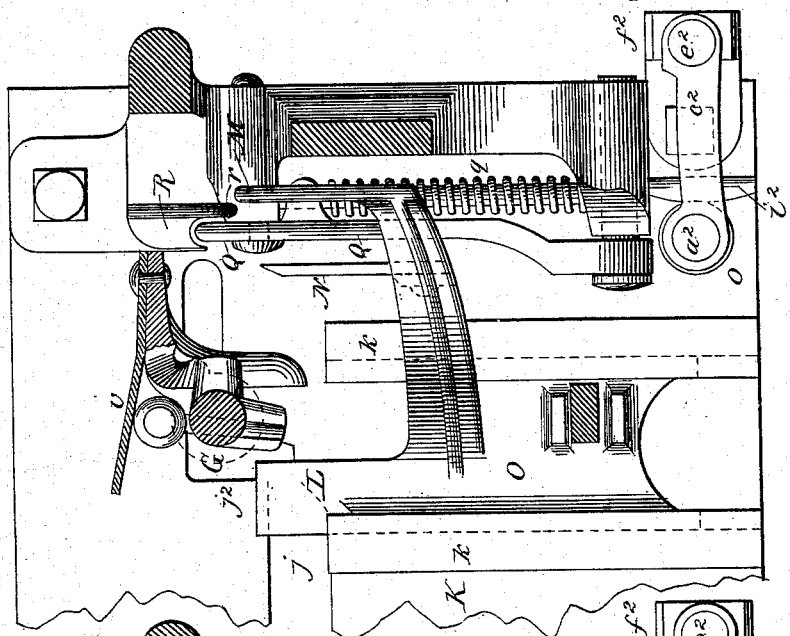

(Model.)
J. F. APPLEBY.
GRAIN BINDER.
No. 276,519. Patented Apr. 24, 1883.
5 Sheets—Sheet 1.
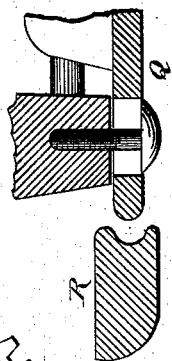
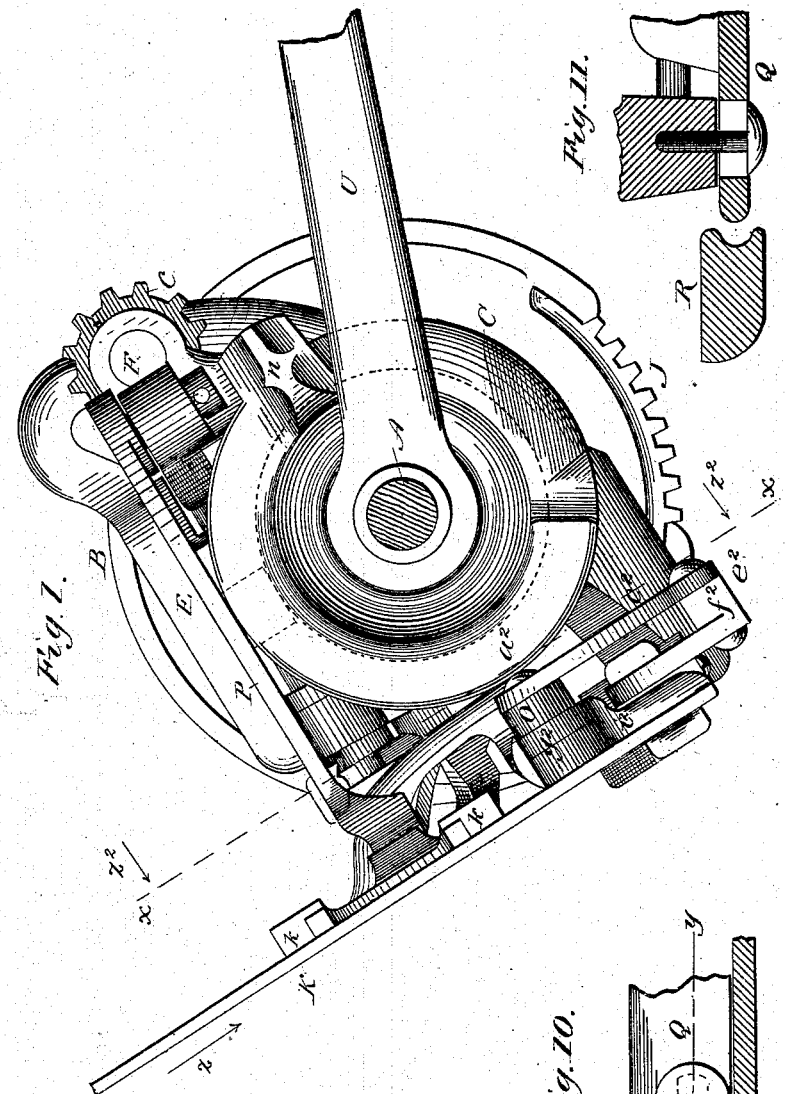
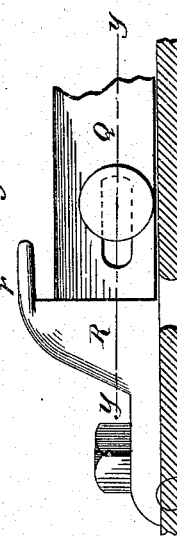
Witnesses.
Jacob Felbel
F. L. Brown
Inventor
Jno. F. Appleby
by atty.

(Model.)
J. F. APPLEBY.
GRAIN BINDER.
No. 276,519. Patented Apr. 24, 1883.
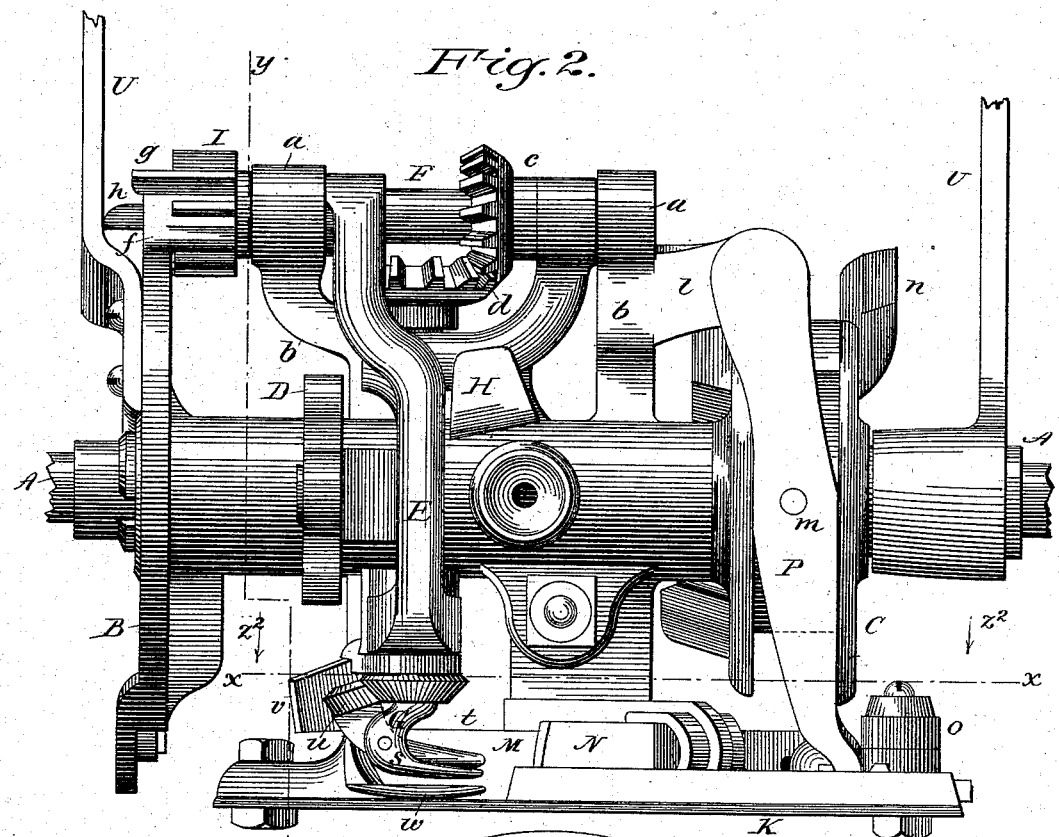
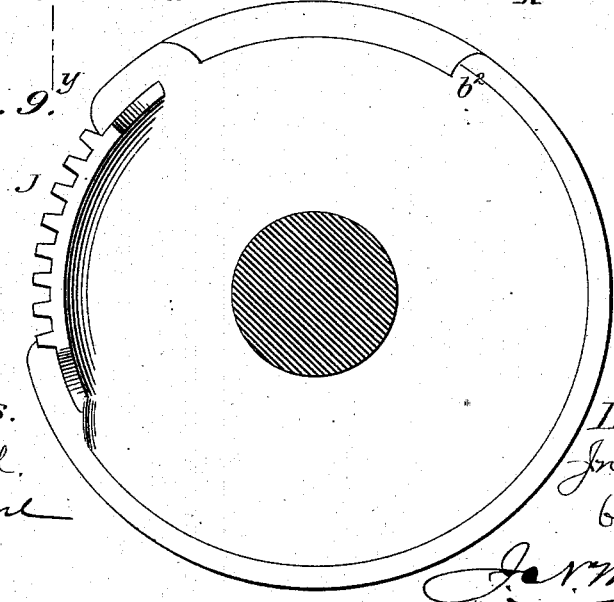
Witnesses.
Jacob Felbel.
F. L. Brown
Inventor.
Jno. F. Appleby
by atty.
J. N. McIntire (Model.)

J. F. APPLEBY.
GRAIN BINDER.

No. 276,519.     Patented Apr. 24, 1883.

Witnesses.
Jacob Felbel
F. L. Bunnel

Inventor.
Jno. F. Appleby.
by atty.

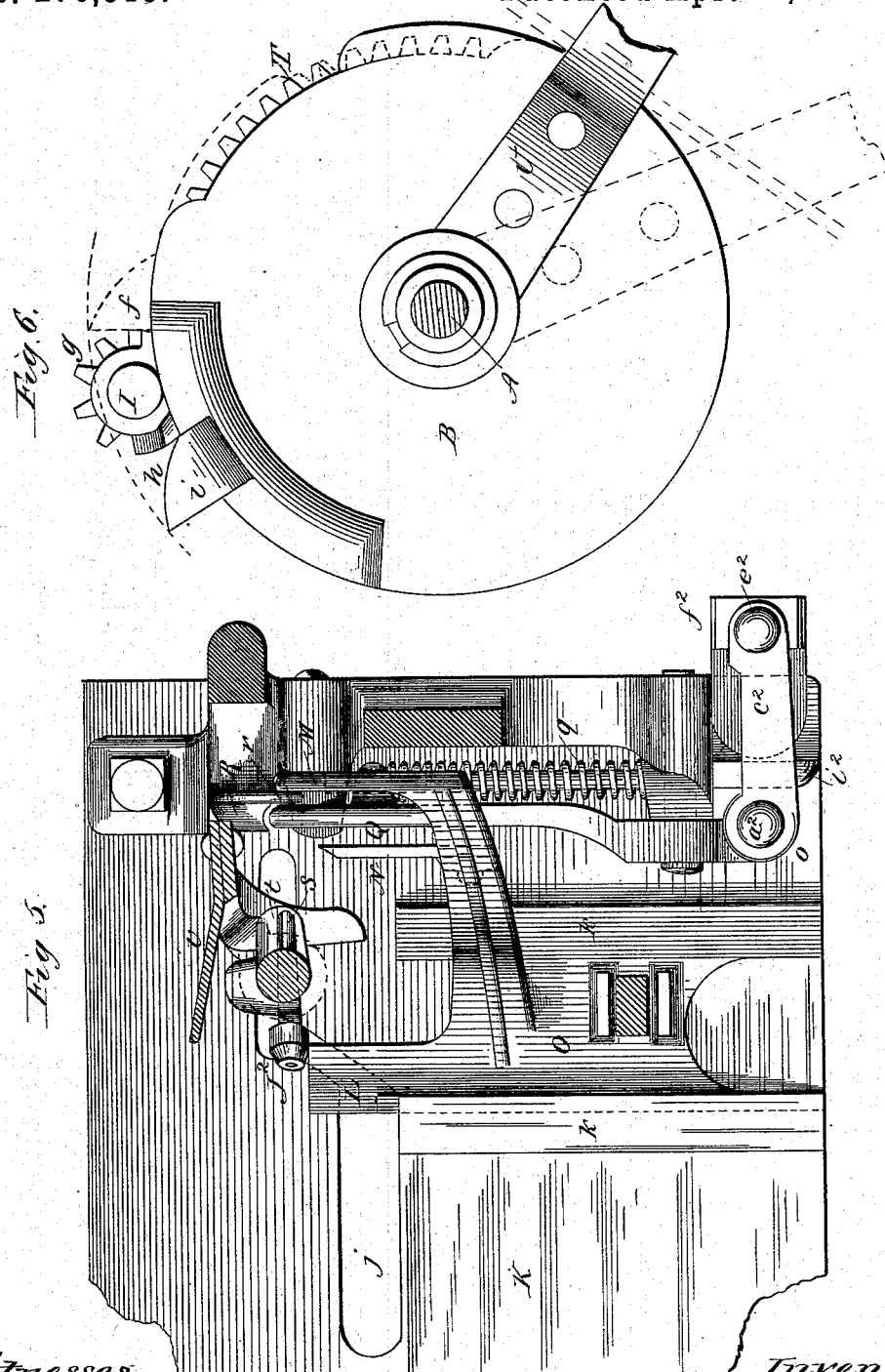

(Model.)
J. F. APPLEBY.
GRAIN BINDER.
No. 276,519. Patented Apr. 24, 1883.
5 Sheets—Sheet 5.
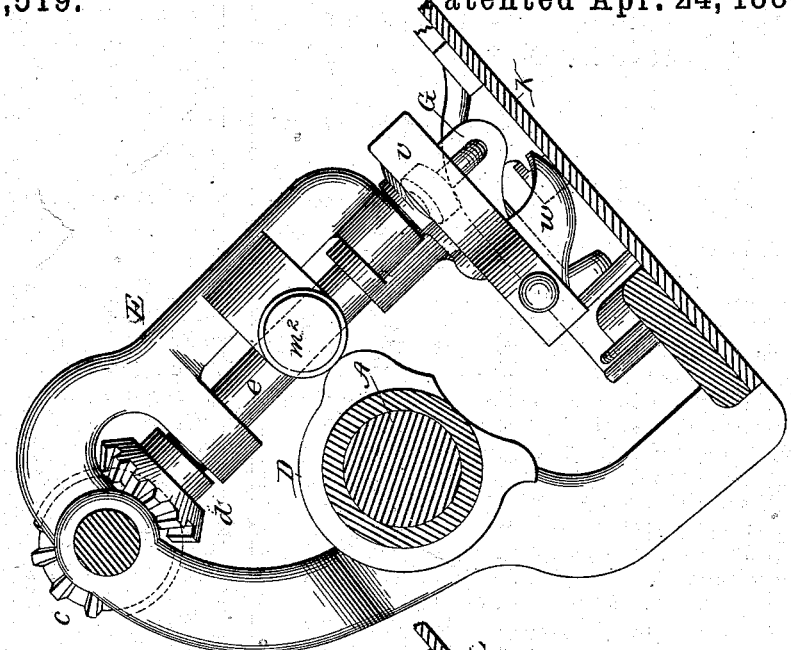
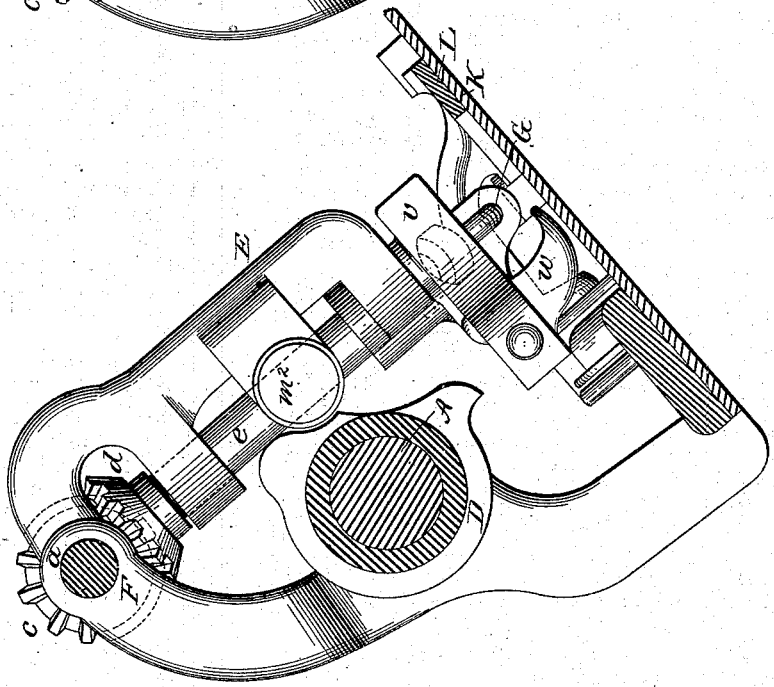
Witnesses:
Jacob Felbel
F. L. Burnne
Inventor:
Jno. F. Appleby
by atty.

UNITED STATES PATENT OFFICE.

JOHN F. APPLEBY, OF MINNEAPOLIS, MINNESOTA, ASSIGNOR TO THE MINNEAPOLIS HARVESTER WORKS, OF SAME PLACE.

GRAIN-BINDER.

SPECIFICATION forming part of Letters Patent No. 276,519, dated April 24, 1883.

Application filed March 29, 1883. (Model.)

*To all whom it may concern:*

Be it known that I, JOHN F. APPLEBY, of Minneapolis, in the county of Hennepin and State of Minnesota, have invented new and useful Improvements in Grain-Binders; and I do hereby declare that the following is a full, clear, and exact description thereof, reference being had to the accompanying drawings, making part of this application.

My invention relates to certain new and useful improvements most applicable to that type of grain-binding machines in which there is a sort of gavel-receptacle adapted to receive the cut grain discharged from the upper end of the elevator of a harvester, and in which the grain which is received into said gavel-receptacle is automatically packed into gavel form, is bound into sheaves by a binder mechanism proper, which operates periodically, and is discharged, when bound, from the lower end of said receptacle, although some of the features of my said invention may be used with more or less advantage in grain-binding machinery of a different type.

My invention has for its main objects to render more efficient and certain all the operations of the mechanisms employed for effecting the proper encirclement of the gavel with the cord and the proper tying up of the gavel within the band of cord, (to form a sheaf,) and to render the binding machinery capable of tying up the grain tighter without any greater or unusual strain on either the cord or the binding mechanism; and to these main ends and objects my invention consists in the novel features of construction and operation of various parts of the binder, hereinafter to be more fully described, and which will be found more particularly pointed out and specified in the claims of this application.

To enable those skilled in the art to which my invention appertains to fully understand and practice the same, I will now proceed to more fully explain it by reference to the accompanying drawings, forming part of this specification, and in which I have illlustrated the several features of my said invention carried out in a form in which I have successfully practiced it in a working-machine, and which manner of carrying out my invention is the best now known to me, though practice and experience may indicate, either to me or to others, some better way of carrying the same into practical operation.

Figure 3:
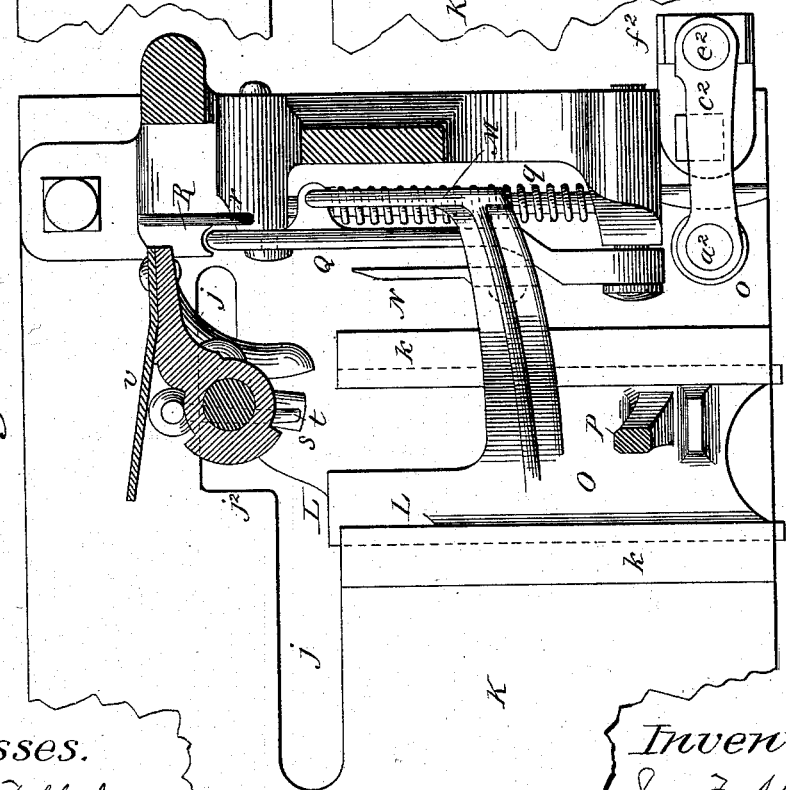

In the said drawings, Figure 1 is a side elevation of so much as seems necessary to be shown of a grain-binder embracing the several features of my said invention. Fig. 2 is a sort of top view of the same, looking at the mechanism at right angles to the inclined plate K, in the direction indicated by the arrow $z$ at Fig. 1. Fig. 3 is a section at the line $x\ x$ of Figs. 1 and 2, with the parts viewed in the direction indicated by the arrows $z^2$ in said figures. Fig. 4 is a similar sectional view, but showing the knotter raised up and to its highest position. Fig. 5 is another similar view, but with the knotter depressed to its lowermost position. Fig. 6 is an elevation, showing the opposite side to that exhibited at Fig. 1, and showing only the cam and rack wheel, the pinion which engages therewith, and the sheaf-discharging arms. Fig. 7 is a partial vertical section at the line $y\ y$ of Fig. 2. Fig. 8 is a similar view, but with the vibratory knotter-frame and its attachments in a different position, and with the position of the cam that lifts said frame changed. Fig. 9 is a detail face view of the cam and rack wheel detached. Fig. 10 is a detail view to illustrate in top view the cord holder or clamp, (the parts being in the relative position they occupy when the cord is clamped by the holder.) Fig. 11 is a detail sectional view at the line $y\ y$ of Fig. 10, but showing the slide of the cord-holder drawn back as it would be at the time of the releasement of the cord.

In the several figures the same part, wherever illustrated, will be found designated by the same reference-letter.

A is the driving-shaft, from which are derived the motions of all the parts of the binder except those of the needle-arm, the packers, and the compressor which acts in opposition to the needle-arm, (if there be one.) Said shaft is mounted in the frame of the binder in about the usual manner seen in what is known in the market as an "Appleby" binder, and it carries the cam and rack wheel B, also a cam-wheel, C, which operates the upper cord-pusher, the lower pusher, the cord-knife, and the slide of the cord-holder, (all as will be presently more fully explained,) and also a cam, D, which operates to lift the knotter-frame E, in a manner to be presently explained.

The knotter-frame E is hung at its bifurcated end on a counter-shaft, F, on which it swings axially of said shaft to a given extent, for the purpose of the elevation and depression (as occasion may require) of the knotter G, the lifting of the knotter and of said frame being affected by the cam D, and the extent to which said frame can be thrown up being restricted by a stop, H.

The shaft F is mounted to turn freely in the bearing-boxes at $a\ a$ in the casting or metallic stand $b$ of the binder, and, while it serves as the pintle about which the frame E vibrates, it acts also to drive through the medium of beveled gears $c$ and $d$ the shaft or spindle $e$ of the knotter. Motion is imparted to the shaft F for the purpose just mentioned by a spur-pinion, I, which periodically engages with and is once rotated by the teeth J of the cam and rack wheel. This spur-pinion I is formed or provided with three lateral projections or lug-like devices, $f$, $g$, and $h$, the first and third of which, acting together, serve to hold the pinion from turning while the wheel B is making a certain part of its revolution, while the one lettered $g$ is for the purpose of turning the shaft $e$ back a quarter-turn by the action of a cam-like projection, $i$, of wheel B, and the one lettered $h$ acts by itself as a stop to the return movement of said knotter-shaft $e$, all as will be hereinafter more fully explained.

K is the metallic plate, located above and forming, so to speak, the usual top or roof-like portion of the gavel-receptacle. This plate K is slotted or cut out at $j$ for the passage through it of the forward portion or end of the needle-arm, and has the slotted part $j$ formed so that the cord will be properly guided as the needle-arm lays it over the knotter, and so that the upper fold or portion of the cord for the sheaf-band will lie immediately beneath the horizontal shoulder portion $j^2$ of said cut-out portion.

L is the upper and M the lower cord-pusher, while N is the cord-knife. All three of these devices are formed on or secured to carriage O, which slides in suitable guideways, $k\ k$, on the plate K, and which is moved back and forth by one end of a lever, P, which at its opposite end is pivoted to an arm, $l$, of the frame $b$, the said lever P being vibrated at the proper time and to the requisite extent by the action of cam-wheel $c$ on an anti-friction roller pivoted to lever P at the point $m$.

On the cam-wheel C is a cam-like lug portion, $n$, which strikes at the proper time against the roller $o$ for the purpose of forcing back (to open the cord-holder) the sliding bar Q. This bar Q is moved and held in the opposite direction (to keep the cord-holder closed) by a strong spiral spring, $q$, and its operative end is made rounding, as shown, so as to co-act, in a manner to be presently explained, with a stationary recessed piece, R, for the purpose of holding fast on or clamping the cord. This piece R is formed with a small horn, $r$, for a purpose which will hereinafter appear.

The knotter is very analogous to the kind used in the well-known Appleby binder, and is composed of a bill-like device, $s$, having combined with it a swinging jaw-piece, $t$, the heel $u$ of which is acted on by a strong spring-plate, $v$. A little way below the bill of the knotter is a cord-rest, $w$, the operation of which will be presently explained.

In the operation of my improved machine the parts shown in the drawings work separately and together, as I will now explain.

Supposing the knotter to be elevated to that position where it must be when the roller $m^2$ of the swinging frame E is resting on the circular part of the periphery of cam D, and supposing, also, the banding-cord is held fast between the slide Q and stationary jaw R of the cord-holder, the gavel is formed in the loop of the cord, about as usual, and when the binder devices proper start into operation the needle-arm carries the second fold of the cord over and around the gavel (about as usual) and lays it over the bill and jaw of the knotter, (these two parts being closed together at this time and the knotter in a horizontal position,) carrying said fold of the cord down below and placing it alongside of the slide Q of the cord-holder. The shape of the slot in plate K is such as to insure the guidance of this second fold of the cord, so that it will be properly laid over the knotter, along with the first fold, (that comes from the cord-holder upward, thence over the knotter, and thence downward under the gavel.) The second fold of the cord is guided to a position such that after leaving the knotter it passes obliquely upward and beneath the ledge at $j^2$ of plate K. The next operations now are by the knotter and the carriage O, the former of which is lifted to its highest position, while at the same time the upper and lower pushers, L and M, of said carriage operate, the former to push the upper part of the second fold of the cord well along beneath the ledge $j^2$, and the latter to push the lower part of said fold of the cord along to a position near the end of slide Q, and between it and the horn $r$. By these operations the holding down of the upper fold of the cord at a short distance from the knotter is insured, and the direction in which this fold of the cord runs off from the top of the knotter is so changed (by the elevation of the knotter bodily) that when the knotter shall subsequently turn there will be no possibility of the cord being missed by the bill and jaws as they turn the cord over and around themselves. The knotter, when thus raised to its highest position, is carried up to a point such that in descending therefrom to its lowermost position it will have an opportunity to take up or wind up onto itself all the cord necessary to be taken up of the two folds running from the knotter down toward the cord-holder. Of course when the knotter ascends, as first explained, to the highest position its bill and jaw slide against both folds of the cord that lie over the knotter, (one of which folds is held down to the cord-holder over the other by the needle-eye,) and when the knotter descends it rotates at the same time on the axis of shaft $e$, to do the tying up of the knot. The descent of the knotter is caused by the pull thereon, or, in other words, by the winding up on the knotter of the two folds of the cord, together with the gravity of the knotter-frame, &c.; but this descent is regulated and timed by the shape of a portion of the periphery of cam D. Inasmuch as the descent of the knotter and the tying up of the cord occur while the needle-arm is about finishing its forward stroke, it follows that the final compression of the gavel between the needle-arm and the opposing compressor will occur just at the right time to prevent any undue strain on the cord while being tied up close around the bundle by the action of the knotter, and this timing, so to speak, of the operations of the compressing and tying devices is important. In forming the knot during the descent of the knotter, as just explained, the bill portion or head $s$ and the jaw $t$ operate together about in the manner these parts work in the knotter of what is well known in the market as the "Appleby" binder; but to avoid any slipping off of the lower fold of the cord during that part of the knotter's revolution where the bill and jaw are in nearly or quite a vertical position, a retaining device, $w$, is added, which acts to hold up and on the knotter the lower fold of the cord. This retainer $w$, extending, as it does, from the piece carrying the spring $y$, is temporarily locked fast to the bill and jaw of the knotter at the time the latter completes the tying operation, so that during a quarter-turn backward of the knotter (to permit the drawing off of the knot) this retaining device is obliged to turn down into a vertical position, and hence does not at such time interfere with the pulling off of the knotted cord.

The retaining device $w$ is made quite thin, and is placed close up to the head of the knotter, and as no stripping device is required it will be seen that the head of the knotter can work close up to the plate K, and consequently close up to the bundle of grain. The great advantage, of course, of this is that the knot can be tied so close to the grain that no slack in the band will be left for the grain of the sheaf to expand into. The capacity of the knotter to permit the pulling off of the knot and to work close up to the grain arises from the following novel mode of operation, viz: After having completed its revolution about the axis of shaft $e$, (effected by the engagement of the teeth J of the cam and rack wheel with the pin I,) the knotter is turned backwardly a quarter-revolution, so as to have its bill point downward, (the retainer $w$ being turned with it.) In this position, it will be observed, the tied knot can easily be pulled off of the bill by the discharge of the sheaf, which is swept out by the sheave-discharging arms U U; but to expedite and insure the extrication of the knot from the bill and jaw of the knotter, the latter is bodily lifted or elevated at the same time that the sheave-discharging arms sweep the bound bundle out of the gavel-receptacle. The lifting of the knotter assists the extrication of the knot in two ways, viz: first, by pulling in opposition to the pull of the outgoing sheaf, and, second, by reason of the bill and jaw (as they are swung up in the arc of a circle) getting more in line with the downpulling doubly-folded cord, which latter descends past the root or bottom of the slot or cut-out of plate K. The backward movement of the knotter is positively assured by the action of a lug or tappet, $i$, of the rack-wheel B coming against the projection $h$ of pinion I, and causing a quarter turn of the latter, though in some cases, with the knotter made a little differently, this back movement of the latter might be affected wholly by the pull of the outgoing sheaf. Of course the first fold of the cord will have been released and the second fold of the cord (held in the cord-holder) will have been cut during the forepart of the ascending movement of the knotter. As the cord-holder lets go of the first fold of the cord the latter is pulled up out of the way, and in reclosing the cord-holder clamps only the second fold, (above the needle-eye,) which second fold, having been pushed to the right place by pusher M, naturally draws into the bite of the cord-holder. At this time the knife N is forced hard against the second fold of the cord, and then as the knotter ascends the action of the knife during its further movement is facilitated by the rise of the knotter. The backward quarter-turn of the knotter occurs, it will be understood, immediately after the releasement of the first fold, the clamping of the second, and the cutting of the latter, (which three operations occur in rapid succession.) As the knotter in rising to assist the extrication of the knot, goes on and up to its highest elevation, it follows that the escape of the bound bundle is facilitated by the knotter pulling the tied ends of the cord away from the bottom of the slot in plate K. The knotter now partially descends to its first-mentioned position, the shoulder at $b^2$ of the wheel B coming against the lug $g$ of pinion I and turning the shaft $e$ so as to place the bill (and closed jaw) of the knotter in a horizontal position, ready to tie another bundle.

It will be seen that the cord-holder is formed of the clamping end of slide Q and the recessed device R, and that these parts, where they come together, are designed to be shaped to match perfectly together and are semicircular. By this construction a strong bite is obtained, the cord being pressed tighter at the impinging ends of the semicircles or arcs than at the point where the middle portions of the arcs come against the cord. Every time the point of the needle ascends it lays the cord, running from the bite of the cord-holder beneath and upwardly around the outside of and against the horn or prong $r$, and every time the needle descends to encircle the gavel with cord it lays the next fold of the cord alongside of the slide Q and clear of the prong $r$, so that when the pusher M shall move forward it will push the latter fold up near to the point where the slide Q and piece R come together, from whence said cord fold will naturally be drawn into the bite of the cord-holder when the latter opens to let out the fold already held in it. The functions of the horn $r$ are these: First, it helps to hold fast the clamped cord, since the latter takes a partial turn around it as it passes from the cord-holder beneath and up past the side of said horn; second, it prevents any entanglement of the outgoing and incoming folds of the cord, since one fold passes down from the cord-holder and thence up outside of the horn, while the other fold is pushed in a vertical condition past the lower crooked end of the first-named fold; and, third, it insures the clearing of the released first fold of the cord from the cord-holder when the latter is closing on the second fold, because at this time, the first fold being pulled upward, the lower crooked end is forced by the horn to come away from the cord-holder, instead of possibly dangling in a pendent position over the cord-holder, where its lower end might be caught in the closing of the slide Q to grip the new fold.

The construction and timing of the cams and other parts are such, it will be seen, that the cord-holder quickly releases the clamped fold of the cord just about as the knotter has completed its tying revolution, and then, after the knotter has moved up some, to pull out the end of the cord released by the cord-holder, the latter closed by the action of its spiral spring and clamps the second or outer fold of the cord. Then, during a slight rest of the knotter in one position, the knife comes up and pushes against this second fold, so that when the knotter resumes its ascending movement it will assist the knife in its work.

In order to more easily move the slide Q in opposition to the spring $q$, and with the quick motion requisite, I use the cam-like device $n$, acting on the anti-friction roller $o$, and mount the latter and the rear end of slide Q on a pivot, $a^2$, arranged at the upper end of a link, $c^2$, (hung by a pivot, $e^2$, to the stand $f^2$,) and provide the rear end of slide Q with a roller, $g^2$, which rides on the curved track or way $i^2$. In this way all the twisting strain on the slide when the roller $o$ is struck by cam $n$ is avoided, and the parts are made to work smoothly and durably.

As certain matter herein shown and described, but not claimed, is claimed by me in another application filed August 12, 1882, of which this is a division, I hereby disclaim such unclaimed matter in this case.

What I claim as new, and desire to secure by Letters Patent, is—

1. A knotter which moves bodily upward after the laying over its bill of the two folds of the cord, substantially as and for the purpose set forth.

2. A knotter which moves bodily upward after the cord has been laid over it, in combination with means for holding the second fold of the cord downward at a point between the knotter and the bundle, whereby the grasping of the second fold of the cord by the bill of the knotter, as the latter begins its rotation, is insured, as set forth.

3. In combination with the knotter, a device arranged below the knotter and operating to prevent the slipping off of the lower or first fold of the cord during the latter part of the rotation of the knotter, as set forth.

4. A revolving knotter which is adapted to be and which is turned backward (after having formed the knot) so that the bill comes substantially in line with the direction of pull of the tied cord, to permit the ready pulling off from said bill of the knot, in the manner set forth.

5. A knotter which both turns back on its axis and moves bodily away from the bundle to facilitate the pulling off and tightening of the tied knot, as set forth.

6. In combination with a knotter which turns backward or into a position such as to permit the drawing off downwardly of the knot by the pull of the outgoing bundle, a cord rest or retainer, $w$, which turns out of the way of the cord only at the time of the pulling of the knot from the knotter, as set forth.

7. In combination with the hold-down ledge $j^2$, a pusher, L, substantially as and for the purpose explained.

8. In combination with a cord-holder which clamps the cord fast, a moving knotter, these parts operating, as described, so that the knotter will draw the released fold of the cord away from the holder when the latter is open, as set forth.

9. In combination with the moving knotter and the cord-holder, a knife which comes against the cord to be cut while the latter is distended between the holder and the knotter, and continues its stroke while the knotter moves away from the holder, all substantially as set forth.

10. In combination with the cord-clamp, the pusher M and horn $r$, whereby the folds to be alternately released from and grasped by the cord-holder are prevented from getting mixed or wrongly treated by the cord-holder.

11. The horn $r$, in combination with the cord holder or clamp and means for laying the first fold of the cord from the cord-holder beneath said horn and thence upwardly and partially around it, substantially as and for the purposes set forth.

12. In combination with a knotter adapted to move up before beginning to turn, the plate K, provided with ledge $j^2$ in the opening or slot through which the cord is passed, substantially as and for the purpose set forth.

In testimony whereof I have hereunto set my hand and seal this 22d day of March, 1883.

JOHN F. APPLEBY. [L. S.]

In presence of—
C. MORRISON,
C. M. CASTLE.